United States Patent [19]

Worcester

[11] Patent Number: 4,728,507

[45] Date of Patent: Mar. 1, 1988

[54] PREPARATION OF REACTIVE METAL HYDRIDES

[75] Inventor: Samuel A. Worcester, Ogden, Utah

[73] Assignee: Westinghouse Electric Corp., Pittsburgh, Pa.

[21] Appl. No.: 2,058

[22] Filed: Jan. 9, 1987

[51] Int. Cl.4 ............................................. C01B 6/02
[52] U.S. Cl. .......................... 423/645; 423/DIG. 12; 204/164
[58] Field of Search ...................... 423/645, DIG. 12; 204/164

[56] References Cited

U.S. PATENT DOCUMENTS

| | | | |
|---|---|---|---|
| 2,411,524 | 11/1946 | Davis | 423/645 |
| 2,943,931 | 7/1960 | Hiller | 423/645 |
| 3,376,107 | 4/1968 | Oka | 423/645 |
| 3,776,855 | 12/1973 | Raymond et al. | 252/640 |
| 3,803,043 | 4/1974 | Magladry et al. | 75/84.4 |
| 3,843,352 | 10/1974 | Ulrich | 75/0.5 B |
| 3,848,068 | 11/1974 | Rice | 75/10.22 |
| 4,300,946 | 11/1981 | Simons | 252/625 |
| 4,470,847 | 9/1984 | Hard et al. | 423/335 |
| 4,629,720 | 12/1986 | Suzuki et al. | 423/645 |

FOREIGN PATENT DOCUMENTS

| | | | |
|---|---|---|---|
| 1130186 | 12/1959 | Fed. Rep. of Germany | 423/645 |
| 50-17956 | 6/1975 | Japan | 423/645 |

OTHER PUBLICATIONS

Airco, Manual of Carbon and Graphite, Air Reduction Company, 1968, pp. 128–129.

Primary Examiner—Patrick P. Garvin, Sr.
Assistant Examiner—Paige C. Harvey
Attorney, Agent, or Firm—R. A. Stoltz

[57] ABSTRACT

Transition metal, notably zirconium alloy, is melted (e.g., by a plasma) to form droplets within the size range of minus 20, plus 60 mesh. The droplets are exposed to a hydrogen atmosphere for a short period while cooling through the hydriding temperature range (e.g., 600° C. to 400° C.). A friable particulate of uniform size and hydrogen content, suitable for sintering or forming components, is recovered.

11 Claims, 1 Drawing Figure

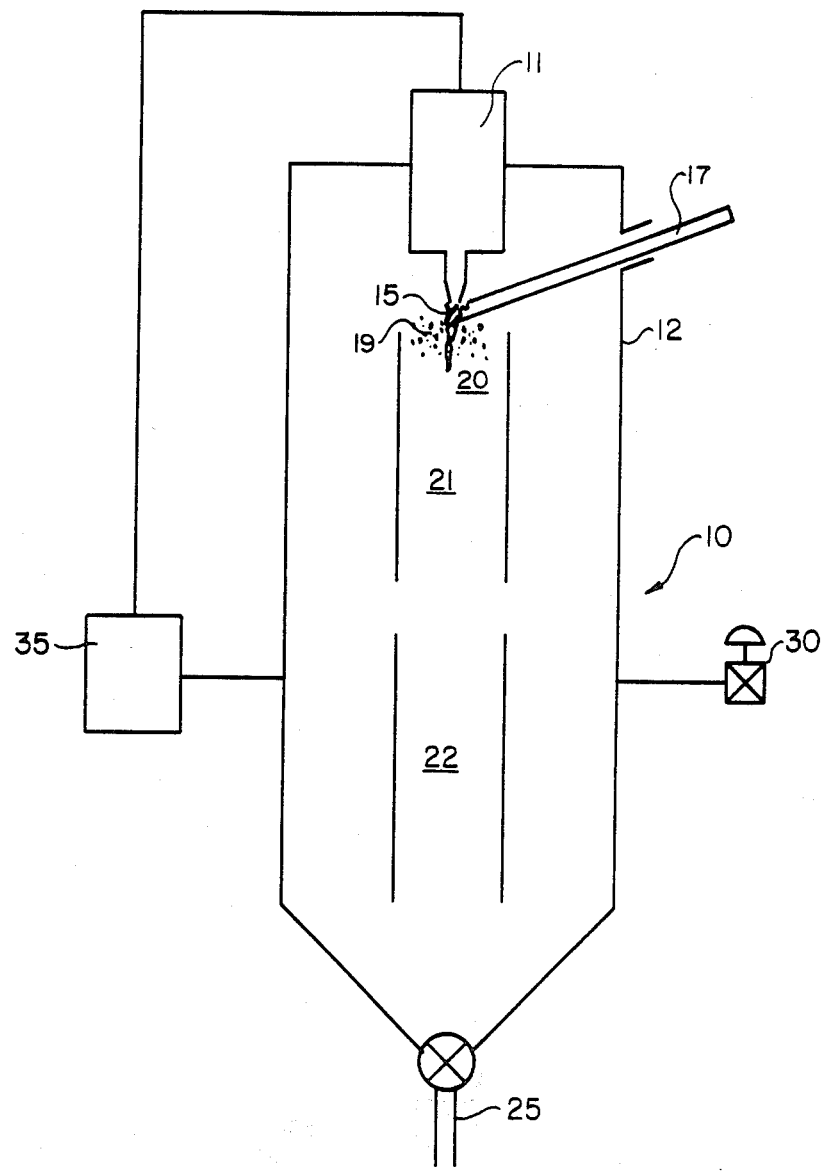

PREPARATION OF REACTIVE METAL HYDRIDES

BACKGROUND OF THE INVENTION

1. Field:

This invention relates to the production of hydrides of Group IV-b and V-b transition metals and their alloys. It is specifically directed to the production of such hydrides from molten metal droplets.

2. State of the Art:

The preparation of metal hydrides, either intentionally or as an inherent consequence of other procedures is well known. The technology of effecting an absorption of hydrogen gas by a transition metal to form a hydride has been well developed in connection with the production of sponge or alloyed metallic materials predominating in metals of Group IV-b and V-b (notably Ti, Zr, Hf, V, Nb, Ta) of the periodic table of elements. The hydriding process of reactive metals as conventionally practiced is disclosed, for example, by U.S. Pat. Nos. 3,376,107; 3,776,855; and 4,470,847, the disclosures of which are incorporated herein by reference.

Metal hydrides, typically of the formula $MH_2$, wherein M is a metal capable of reacting with hydrogen, are characteristically brittle. This characteristic is useful in the manufacture of particulate metals. For example, a sheet of metal may be heated to its reactive temperature and exposed to hydrogen gas. After a period of several hours, the metal becomes substantially hydrided; that is, the metal absorbs about one to three or more percent by weight (depending upon the molecular weight of the metal) hydrogen. It is thus brittle and susceptible to comminution to powdered form. The powder can then be heated or otherwise treated to remove the hydrogen. U.S. Pat. No. 4,300,946, the disclosure of which is incorporated by reference, discloses, for example, a method whereby metal is heated in the presence of hydrogen while concurrently being subjected to mechanical impact to obtain a particulate hydride of average particle size of less than about one centimeter.

Plasma generators have been used in various contexts in connection with the preparation or treatment of reactive metal hydrides. U.S. Pat. Nos. 3,803,403; 3,843,352; and 3,848,068, the disclosures of which are incorporated herein by reference, disclose representative procedures utilizing plasma heating. The process of U.S. Pat. No. 3,803,043 utilizes a plasma arc to generate spherical, but non-friable particles. The particles are then fabricated into an object, and the object is thereafter utilized as a hydrogen storage (through reversible hydriding) device. U.S. Pat. No. 3,843,352 utilizes a gas plasma in a cooled metal crucible to melt sponge metal. U.S. Pat. No. 3,848,068 vaporizes metal powder with a plasma and rapidly quenches the vapor to obtain ultra pure finely divided metal compounds, such as metal hydride. The plasma gas may contain up to 100 percent reactive gas; e.g., hydrogen. Particulate metal; e.g., zirconium and its alloys, preferably of minus 200 mesh size, is introduced to the plasma stream. The metallic material is vaporized, and the vapors react with the reactant gas of the plasma. The plasma stream and reaction products are rapidly quenched. Other processes have been suggested whereby a hydrogen gas plasma is directed against a pool of molten metal to supersaturate a region of the pool with hydrogen. The supersaturated composition migrates to a cooler region of the pool whereupon the absorbed hydrogen is expelled and carries microfine solid pure metal out of the pool for recovery.

The phase diagrams of the transition metals and their alloying elements are characterized by diverse phases occuring at the temperatures at which hydrogen absorption is promoted. (A representative such diagram for zirconium appears in U.S. Pat. No. 3,776,855.) Accordingly, there is a tendency for an alloy to degrade in composition during the hydriding procedure. Moreover, hydrogen solubility in the metals of most interest, notably zirconium, is lower at elevated temperatures, particularly in the molten metal range. Generally, to obtain adequate hydrogen absorption, it is necessary to expose the metal to hydrogen at the temperature range of about 400° C. to about 800° C. In the transition metal alloy systems, the various alloying metals tend to segragate into different phases if held too long in this temperature range. For example, in the zirconium system, iron, chromium and niobium tend to segragate into a beta phase, while tin segragates into an alpha phase.

There remains a need in the art for a method whereby hydrides of transition metal alloys may be formed rapidly without degradation.

SUMMARY OF THE INVENTION

The procedures of this invention are generally applicable to the production of hydrides from metallic materials capable of reacting with hydrogen. Presently, the materials of most interest are alloys of transition metals, notably those of Groups IV-b and V-b of the periodic chart of elements. The invention is described herein with particular reference to zirconium alloys because it offers particular benefits as applied to those materials.

Metal hydrides, e.g., zirconium alloys hydrides, are produced by introducing the metal to a melting zone under conditions which form individual droplets of the material. The individual droplets are exposed to a hydrogen atmoshpere as they are cooled to within a temperature range which promotes the desired degree of hydrogen absorption. Usually, the desired degree of absorption is that which renders the product sufficiently friable for use in powder metallurgy procedures. Because the droplets are relatively small, absorption occurs rapidly, typically in less than a minute. The resulting particulate hydride is then cooled to below the hydriding reaction temperature (the temperature at which hydrogen is absorbed at a commercially practical rate, typically above about 300° C.) of the metal. The particulate product is brittle and susceptible to grinding and sizing, if desired. Expedients may be incorporated in the process, however, to ensure the production of a properly sized, e.g., −20 mesh to about +60 mesh (Tyler), particulate hydride product.

The melting zone may include various mechanical or other dynamic means for dispersing melted metal into droplets of preselected size. The presently preferred means for this purpose is a turbulent, inert or hydrogen atmosphere. Hydrogen is desirably present in an amount effective to promote the plasma flame and the hydrides of the molten metal. Molten metal is introduced into the melting zone, preferably in small volumes at controlled rates. High energy heating sources, such as a plasma flame, are presently considered ideal, both for melting feed stock and for droplet formation. A plasma torch may be configured as a melting chamber or included as a portion of a melting zone. Some hydriding may occur in the melting zone, but the preparation of active (unreacted) molten metal surface area is of priimary interest in this zone.

The droplets formed in the melting zone are passed through a hydriding zone in which they are exposed to a hydrogen atmosphere under pressure, temperature and dynamic conditions which promote hydrogen absorption. Hydriding can occur very rapidly in view of the small size of the droplets, and because the entire surface of each droplet is substantially free from passive coatings. Accordingly, the droplets solidify and react to the desired friable characteristic within a few seconds, usually in much less than a minute following their formation in the melting zone. The dynamics of the hydriding atmosphere may be controlled as desired between quiescent and turbulent. Droplet 19 formation in accordance with this invention can be controlled to avoid the production of large quantities of fines. Nevertheless, countercurrent flow may be utilized in the hydriding zone to separate fines or to otherwise assist in the classification of the hydrided product into desired size fractions.

The hydrided product of this invention may be purified by methods well known by those skilled in the art. Alternatively, the hydrided product may be crushed and sized or pressed into forms and then purified. In any event, a particular advantage of this invention is the production of particulate or formed metal objects from transition metal alloys wherein the alloy phase composition is substantially unchanged by virtue of the hydriding process. This quality is especially significant with respect to the commercially important alloys of zirconium.

BRIEF DESCRIPTION OF THE DRAWINGS

The drawing is a schematic diagram of a hydriding reactor in which the procedures presently regarded as the best mode for carrying out the invention may be practiced.

DESCRIPTION OF THE ILLUSTRATED EMBODIMENT

A hydriding reactor, designated generally 10, includes a plasma torch 11 mounted atop a cylindrical column 12. The torch 11 produces a flame 15 into which is introduced metal feed 17. The feed illustrated as solic zirconium bar stock, but could alternately be in the form of chips or powder conveyed to the vortex of the flame 15. There is no necessity for the feed material to be machined or otherwise precisely formed.

The plasma flame 15 may be an inert gas plasma, but desirably includes hydrogen gas. The appropriate partial pressure of hydrogen may be determined empirically by monitoring the product recovered from the reactor 10. The plasma torch 11 is operated to produce turbulence at the top of the column 12, thereby to form discrete droplets, preferably within the size range of minus 20 mesh (Tyler) in the region 20. Although the temperature of these droplets is initially above the efficient hydriding range, some hydrogen is nevertheless adsorbed in the region 20. A hydrogen atmosphere is maintained within the entire column 12, and additional hydrogen is adsorbed during transit of the droplets through the region 21, wherein the temperature is controlled to within the hydriding range; in the case of zirconium alloys, about 300° C. to about 700° C., more desirably about 400° C. to about 600° C. The lower region 22 of the interior of column 12 is shown as a quenching or cooling zone. The hydrogen atmosphere is maintained in this region at a temperature appropriate to cool the solidified droplets to below a reactive temperature, and eventually to a temperature convenient for recovery through a discharge mechanism 25. The residence time of the droplets in the hydriding zone comprising the regions 21 and 22 is sufficient for the metal to become friable; in the case of zirconium by absorbing at least about one percent by weight, more desirably at least one and one-half percent by weight hydrogen.

Means 30 are provided for the introduction of hydrogen gas to the interior of the reactor 10. Hydrogen gas may be recirculated through a recirculation system 35, as shown, to the torch 11 or back to the supply means 30.

The hydrides of zirconium, titanium and hafnium sponge or alloy metals produced in accordance with the aforedescribed process fracture easily during pressing to provide high density compacts. The hydrided particulate or the compacts may be vacuum sintered to remove the absorbed hydrogen. The process provides both particle size uniformity and hydrogen uniformity which facilitates attrition to a uniform crushed size, if desired, for subsequent pressing and dehydriding.

Although the process has been described with reference to hydriding, it may be adapted to the preparation of nitrides, chlorides, oxides and the like.

Reference herein to details of the illustrated embodiment is not intended to restrict the scope of the appended claims.

I claim:

1. A method for producing powder metallurgy particulate hydrides principally of a transition metal selected from Groups IV-b and V-b of the periodic table of elements, said method comprising:
    introducing solid bar or chips principally of a Group IV-b or V-b metal to a melting zone under conditions which form and then disperse individual droplets of said metal, wherein said droplets are predominantly within the size range of about −20 mesh to about +60 mesh (Tyler);
    solidifying said droplets while maintaining said droplets dispersed;
    maintaining said solidified droplets in a hydriding zone while cooling from solidification in the presence of hydrogen at a temperature within the range maintained to effect a solidified droplet temperature of between about 300° C. to about 700° C., for sufficient duration for said solidified droplets to become friable; and
    recovering said solidified droplets from said hydriding zone.

2. A method according to claim 1 wherein a melting zone is utilized and a plasma torch is positioned to provide a source of heat and a turbulent atmosphere which cooperatively melt and disperse said metal, thereby to form individual droplets.

3. A method according to claim 2 wherein the surfaces of said droplets in said melting zone, except for metal hydrides formed in said zone, consist substantially of unreacted metal.

4. A method according to claim 1 wherein said droplets have a total residence time in the melting zone and the hydriding zone is of less than about one minute.

5. A method according to claim 4 wherein the atmosphere within the melting zone consists essentially of inert gas and hydrogen.

6. A method according to claim 5 wherein the plasma torch is fed with an inert gas and hydrogen.

7. A method according to claim 6 wherein the metal comprises zirconium or a zirconium alloy, and the solidified droplets are recovered from said hydriding zone after they have absorbed at least about one percent by weight hydrogen.

8. In the process of producing metal hydrides by exposing a Group IV-b metal or alloy capable of reacting with hydrogen to a hydrogen atmosphere at a temperature within the hydriding temperature of that metal, the improvement comprising: melting solid bar or chips of said metal or alloy under conditions which form and disperse droplets and wherein said droplets are predominantly within the size range of about −20 mesh to about +60 mesh (Tyler); solidifying said droplets while maintaining said droplets dispersed; and cooling said solidified droplets in the presence of hydrogen gas, thereby exposing said droplets to hydrogen gas, for a period of up to about one minute at a hydriding temperature of 300°–700° C.

9. An improvement according to claim 8 wherein said metal is zirconium or an alloy of zirconium and the solidified droplets are exposed to hydrogen while cooling from solidification through the range of about 600° C. to about 400° C.

10. The improvement of claim 9, wherein said metal is an alloy of zirconium, and the metallic phase composition of said alloy is essentially unchanged by the hydriding process.

11. The improvement of claim 8, wherein said droplets are maintained dispersed while being cooled at said 300°–700° C. hydriding temperature.

* * * * *